US012784413B2

(12) United States Patent
Shin et al.

(10) Patent No.: US 12,784,413 B2
(45) Date of Patent: Nov. 3, 2026

(54) METHOD, SYSTEM AND NON-TRANSITORY COMPUTER-READABLE RECORDING MEDIUM FOR AUTOMATICALLY IMPROVING AI MODEL PERFORMANCE

(71) Applicant: MUSINSA Co., Ltd., Seoul (KR)

(72) Inventors: Eun Seop Shin, Suwon-si (KR); Won Jong Jo, Seoul (KR); Jeong Tae Cho, Seoul (KR); Ji Hun Lee, Hwaseong-si (KR); Hyung Won Choi, Seoul (KR); Yun Hun Jang, Seoul (KR); Jun Cheol Park, Seoul (KR)

(73) Assignee: MUSINSA Co., Ltd., Seoul (KR)

( * ) Notice: Subject to any disclaimer, the term of this patent is extended or adjusted under 35 U.S.C. 154(b) by 210 days.

(21) Appl. No.: 18/212,897

(22) Filed: Jun. 22, 2023

(65) Prior Publication Data

US 2024/0037919 A1 Feb. 1, 2024

(30) Foreign Application Priority Data

Jun. 23, 2022 (KR) ........................ 10-2022-0076945

(51) Int. Cl.

| | |
|---|---|
| ***G06V 10/774*** | (2022.01) |
| ***G06V 10/77*** | (2022.01) |
| ***G06V 20/30*** | (2022.01) |
| ***G06V 20/60*** | (2022.01) |
| ***G06V 20/70*** | (2022.01) |

(52) U.S. Cl.

CPC ........ *G06V 10/774* (2022.01); *G06V 10/7715* (2022.01); *G06V 20/30* (2022.01); *G06V 20/60* (2022.01); *G06V 20/70* (2022.01)

(58) Field of Classification Search

CPC .. G06V 10/7715; G06V 10/774; G06V 20/30; G06V 20/60; G06V 20/70; G06V 40/10; G06V 10/77

See application file for complete search history.

(56) References Cited

U.S. PATENT DOCUMENTS

| | | | | |
|---|---|---|---|---|
| 12,211,253 | B1 * | 1/2025 | Perla | G06V 10/40 |
| 2020/0320348 | A1 * | 10/2020 | Yang | G06F 40/284 |
| 2022/0245572 | A1 * | 8/2022 | Kamarchik | G06Q 30/0202 |
| 2023/0072400 | A1 * | 3/2023 | Bajpai | G06T 7/11 |
| 2023/0116897 | A1 * | 4/2023 | Hosseinzadeh Taher | G06V 10/774 382/156 |

FOREIGN PATENT DOCUMENTS

| | | | |
|---|---|---|---|
| KR | 102032519 | B1 | 11/2019 |
| KR | 102097869 | B1 | 4/2020 |

* cited by examiner

*Primary Examiner* — Michael J Vanchy, Jr.

(74) *Attorney, Agent, or Firm* — Dinsmore & Shohl LLP; Yongsok Choi, Esq.

(57) ABSTRACT

A method of automatically improving artificial intelligence (AI) model performance is provided. The method includes: collecting image data including at least one item; performing pre-training based on self-supervised training for a pre-training model by using the image data; and setting initial values of the AI model and performing fine-tuning by using the pre-training model.

4 Claims, 6 Drawing Sheets

METHOD, SYSTEM AND NON-TRANSITORY COMPUTER-READABLE RECORDING MEDIUM FOR AUTOMATICALLY IMPROVING AI MODEL PERFORMANCE

CROSS-REFERENCE TO RELATED APPLICATION

This application claims priority to Korean Patent Application No. 10-2022-0076945 filed on Jun. 23, 2022, the entire contents of which are herein incorporated by reference.

TECHNICAL FIELD

The present disclosure relates to a method, a system, and a computer-readable recording medium for automatically improving artificial intelligence (AI) model performance. Specifically, the present disclosure relates to a method, a system, and a computer-readable recording medium for constructing a general-purpose AI model by performing pre-training based on self-supervised training on a large amount of image data to be periodically added and improving the performance of the AI model through a fine-tuning process.

BACKGROUND

Recently, AI technology using machine learning model has been used in various service fields, and especially in the fashion industry, the demand for model training using AI model to analyze and respond to rapidly changing trends has been increasing.

To improve the quality of services using AI model, upfront work is required to train the AI model on a large amount of training data. Supervised training, one of the machine learning methods for AI models, may be used to train a model by training labeled answer data and minimizing the error between predicted and correct values. Such models based on supervised training have the advantage of being easier to train, more stable, and easier to evaluate performance than unsupervised learning or reinforcement learning methods due to the existence of clear answer data. However, they require a large amount of training data to improve the performance of the training model, and the process of preparing such a large amount of high-quality training data takes a lot of time and human resources.

In recent years, research has been conducted on self-supervised training, which trains, from unlabeled data, universal features capable being easily applied to a variety of matters through the relationships between the data. For example, Korean Patent No. 10-2097869 discloses a deep learning based road area estimation apparatus and method using self-supervised training. The related art discloses a method for accurately estimating roads with training on a small number of images by pre-training on unlabeled images, which is limited to the specific field of road area estimation.

In the fashion industry, AI model is required to detect fashion items on image data, analyze their attributes, and continuously update the AI models to improve their performance in order to respond to changing trends. Therefore, the inventors of the present disclosure propose a method and system for automatically improving the performance of AI models using continuously added data for various AI models that may be used in the fashion business.

SUMMARY

One object of the present disclosure is to solve all the above-described problems.

Another object of the present disclosure is to provide a method and a system for automatically improving the performance of an AI model by continuously adding data.

Yet another object of the present disclosure is to improve the performance of an AI model by utilizing image and text information of image data including fashion items.

Representative configurations of the present disclosure to achieve the above objects are described below.

According to one aspect of the present disclosure, there is a provided a method of automatically improving an AI model performance, comprising: collecting image data including at least one item; performing pre-training based on self-supervised training for a pre-training model by using the image data; and setting initial values of the AI model and performing fine-tuning by using the pre-training model.

According to one embodiment of the present disclosure, the step of performing self-training based on self-supervised training for the pre-training model using the image data may further include: extracting fashion attributes associated with the image data by using an item attribute recognition model to generate a text representation of the image data, and performing pre-training based on self-supervised training by using the text representation along with the image data.

According to one embodiment of the present disclosure, the item attribute recognition model may be a model for detecting the at least one item included in the image data, and recognizing and labeling fashion attributes of the at least one item.

According to one embodiment of the present disclosure, the AI model based on the supervised training may be at least one of an item location detection model, an item attribute recognition model, and an item recognition model.

According to one embodiment of the present disclosure, in the step of collecting image data, images published on an online marketplace or an influencer's social network system (SNS) may be collected at a predetermined interval.

An automated AI model performance improvement system according to one embodiment of the present disclosure may include: an image data collection unit configured to collect image data including at least one item; a pre-training performing unit configured to perform pre-training based on self-supervised training of a pre-training model by using the image data; and a fine-tuning performing unit configured to set initial values of the AI model and perform fine-tuning by using the pre-training model.

In addition, there are further provided other methods, other systems, and a non-transitory computer-readable recording medium recording computer programs for implementing the present disclosure.

According to the present disclosure, a method and a system for automatically improving the performance of an AI model can be provided by using continuously added data.

Further, according to the present disclosure, a method and a system for improving the performance of an AI model cab be provided by using image and text information for image data including fashion items.

DETAILED DESCRIPTION

Hereinafter, embodiments of the present disclosure will be described in detail with reference to the accompanying drawings. In the following, specific descriptions of functions and configurations already known in the art are omitted if it is deemed that they may unnecessarily obscure the essence of the present disclosure. In addition, it is to be understood that the following description relates merely to one embodiment of the present disclosure and is not intended to limit the present disclosure.

The terms used in the present disclosure are used merely to describe specific embodiments and are not intended to limit the present disclosure. For example, a component expressed in the singular is to be understood as including a plurality of components unless the context clearly indicates that the singular is intended. It is to be understood that the term "and/or" as used in this disclosure is intended to encompass any and all possible combinations of one or more of the enumerated items. The terms "include" or "have" as used in the present disclosure are intended merely to designate the presence of the features, numbers, operations, components, parts, or combinations thereof described herein, and the use of such terms is not intended to exclude the possibility of the presence or addition of one or more other features, numbers, operations, components, parts, or combinations thereof.

In some embodiments of the present disclosure, a 'module' or 'unit' refers to a functional unit that performs at least one function or operation, and may be implemented in hardware or software, or a combination of hardware and software. Furthermore, a plurality of 'modules' or 'units' may be integrated into at least one software module and implemented by at least one processor, with the exception of 'modules' or 'units' that need to be implemented in specific hardware.

Further, unless otherwise defined, all terms used in this disclosure, including technical or scientific terms, may have the same meaning as commonly understood by one of ordinary skill in the art to which the present disclosure belongs. It is to be understood that commonly used dictionary-defined terms should be construed to have a meaning consistent with their contextual meaning in the relevant art and are not to be construed as unduly limiting or expanding unless expressly defined otherwise in the present disclosure.

Hereinafter, a method for automatically improving AI model performance according to one embodiment of the present disclosure will be described in detail with reference to the following drawings.

Figure 1:
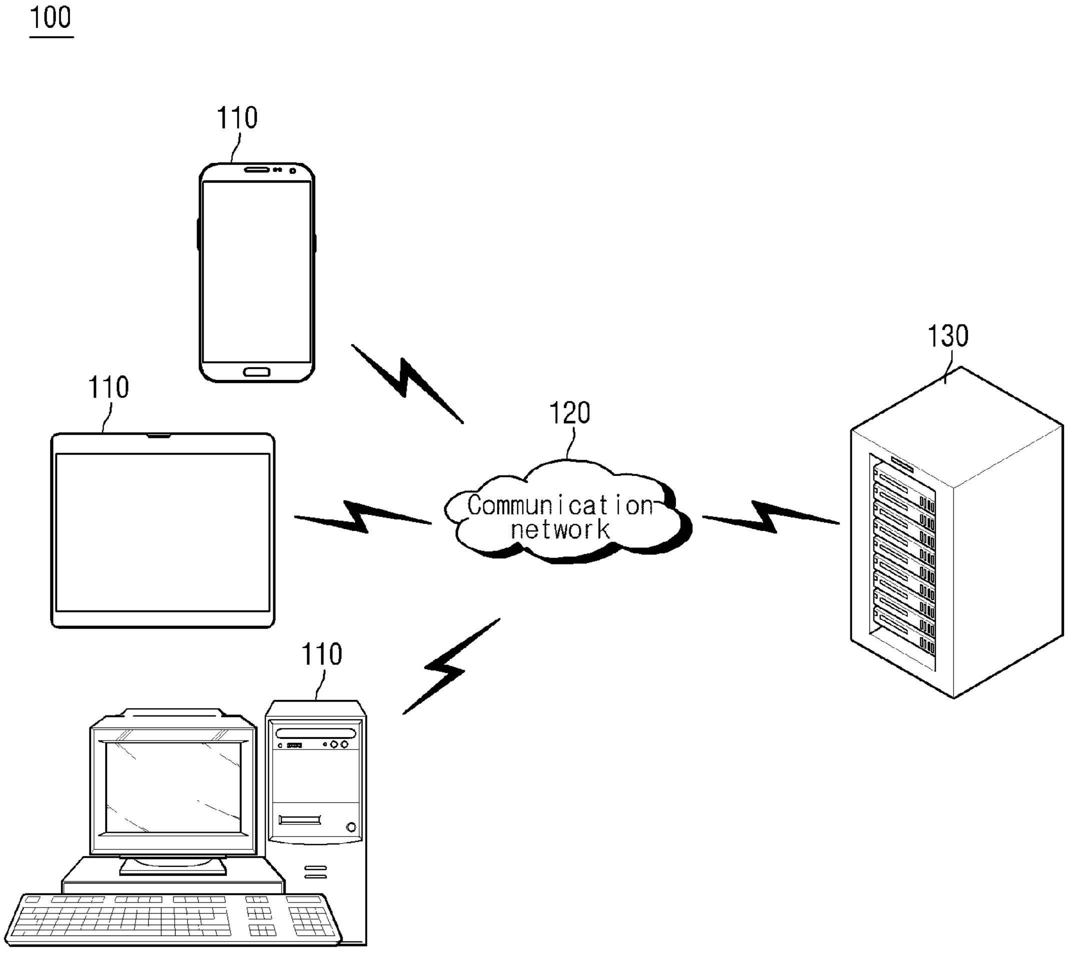
FIG. 1 illustratively shows a schematic configuration of AI model performance improvement system environment according to one embodiment of the present disclosure.

FIG. 1 illustratively shows a schematic configuration of AI model performance improvement system environment according to one embodiment of the present disclosure.

As shown in FIG. 1, an AI model performance improvement system 100 according to one embodiment of the present disclosure may include a plurality of user terminals 110, a communication network 120, and an AI model performance improvement server 130.

The user terminal 110, according to one embodiment of the present disclosure, is a digital device that includes the capability to access and communicate with the AI model performance improvement server 130 via the communication network 120. The user terminal 110 may be a portable digital device having memory means and computing capability by means of a microprocessor, such as a smartphone, tablet PC, or the like, and is not limited to any particular form. Three user terminals are illustrated in the present drawings, but the present disclosure is not limited thereto.

According to one embodiment of the present disclosure, various forms of user input received on the user terminal 110 may be communicated to the AI model performance improvement server 130 via the communication network 120. According to one embodiment of the present disclosure, the user terminal 110 may receive various signals transmitted from an external source (e.g., the AI model performance improvement server 130) via the communication network 120.

According to one embodiment of the present disclosure, the user terminal 110 may include an application to support functionality according to the present disclosure. Such an application may be downloaded from the AI model performance improvement server 130 or an external application distribution server (not shown).

The communication network 120 according to one embodiment of the present disclosure may include any communication modality, such as wired communication or wireless communication, and may include various communication networks, such as a local area network (LAN), a metropolitan area network (MAN), or a wide area network (WAN). Preferably, the communication network 120 referred to herein may be the public Internet or the World Wide Web (WWW). However, the communication network 120 may also include, at least in part, a publicly available wired or wireless data communication network, a publicly available telephone network, or a publicly available wired or wireless television communication network, without necessarily being limited thereto.

For example, the communication network 120 may be a wireless data communication network implementing, at least in part, communication methods in the related art such as wireless fidelity (WiFi) communication, WiFi-Direct communication, Long Term Evolution (LTE) communication, Bluetooth communication (e.g., Bluetooth Low Energy (BLE) communication), infrared communication, ultrasonic communication, and the like.

The AI model performance improvement server 130 according to one embodiment of the present disclosure may collect certain image data, perform pre-training based on self-supervised training, and set initial values of the AI model based on supervised training to provide an AI model with improved performance through fine-tuning for each purpose.

Figure 2:
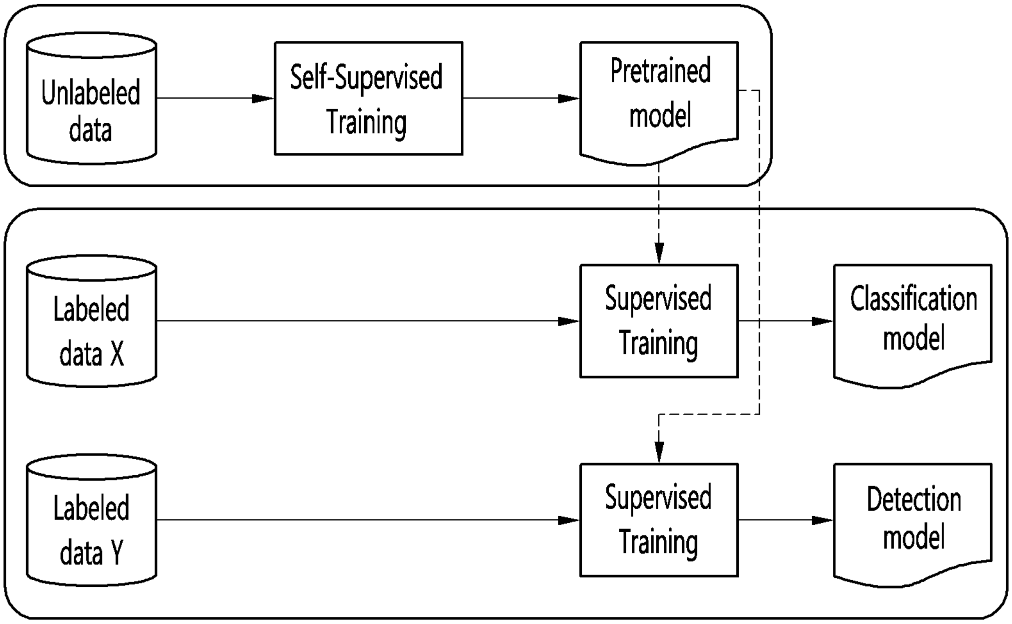
FIG. 2 is a diagram conceptually illustrating an automated AI recognition model performance improvement method performed on the AI model performance improvement server of FIG. 1, according to one embodiment of the present disclosure.

FIG. 2 is a diagram conceptually illustrating an automated AI recognition model performance improvement method performed on the AI model performance improvement server of FIG. 1, according to one embodiment of the present disclosure.

As shown in FIG. 2, an automated AI recognition model performance improvement method may include two steps. In one embodiment, the automated AI recognition model performance improvement method may include: generating a pre-training model based on self-supervised training; and fine-tuning based on a supervised training. For example, in the step of generating the pre-training model based on self-supervised training, generalized features may be trained by using unlabeled data, and the more unlabeled data there have, the more powerful the pre-training model may be. On the other hand, in the step of fine-tuning based on supervised learning, the pre-training model based on the self-supervised training may be fine-tuned, by using a small amount of labeled data, for matters in various fields that fit the purpose of use.

Figure 3:
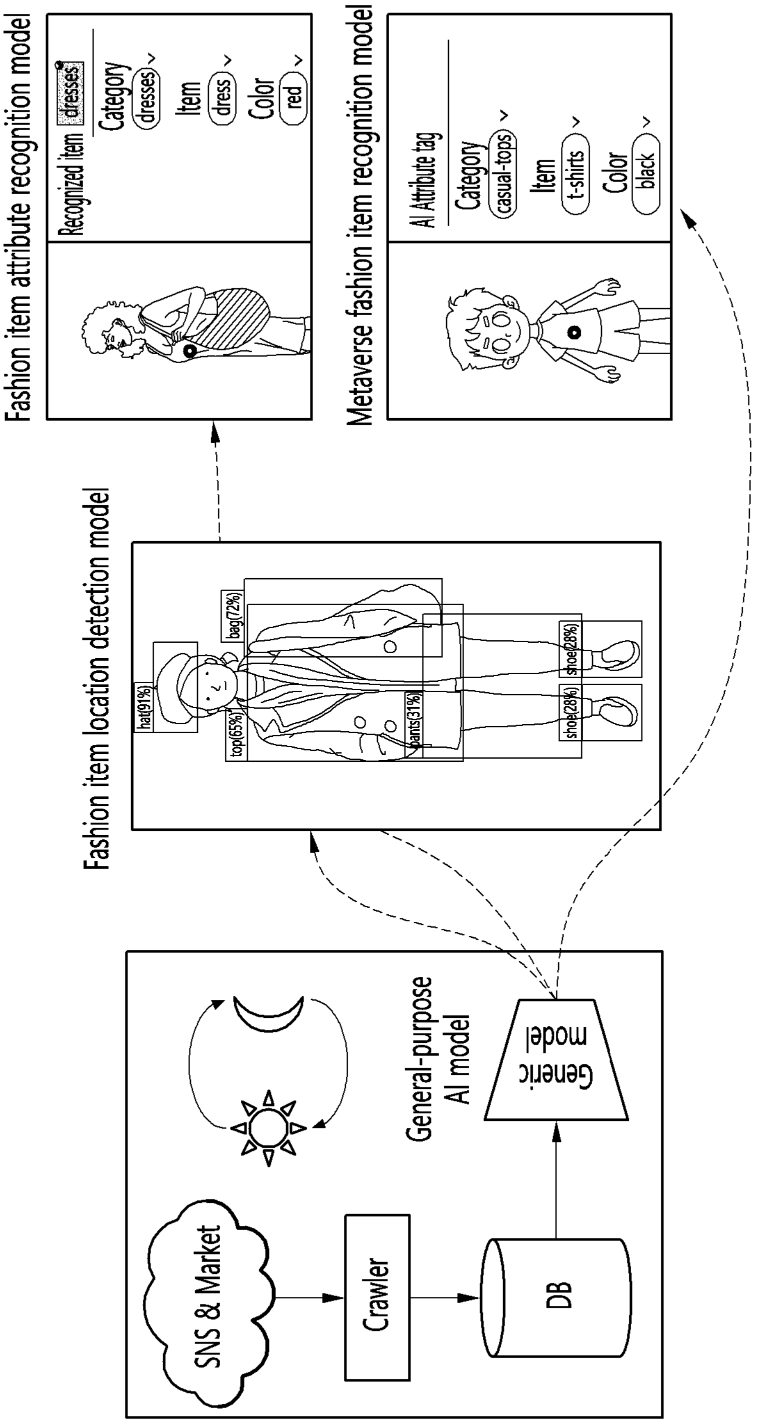
FIG. 3 is a diagram conceptually illustrating a training process for an AI recognition model that is applied to the purpose of various services after training a general-purpose AI model, according to one embodiment of the present disclosure.

FIG. 3 is a diagram conceptually illustrating a training process for an AI recognition model that is applied to the purpose of various services after training a general-purpose AI model, according to one embodiment of the present disclosure.

In one embodiment of the present disclosure, a general-purpose AI model may have structures that data accumulated by the service on a daily basis is utilized for continuous, ongoing training. For example, a general-purpose AI model may be continuously trained utilizing data that is added (updated) at regular periods.

In one embodiment of the present disclosure, a general-purpose AI model may be configured to be applicable to various forms of self-supervised training models. In one embodiment, the general-purpose AI model may be a model utilizing images. In other embodiments, the general-purpose AI model may be a model utilizing image and text information. In one embodiment, for image data without textual information, the general-purpose AI model may generate textual information associated with the image based on the image. For example, a general-purpose AI model may take an image as input, automatically extract fashion attributes, and combine the results and generate a text description representing the image that may be used to train the model.

In one embodiment of the present disclosure, the AI recognition model applied for the purposes of the various services may include at least one of a fashion item location detection model, a fashion item attribute recognition model, and a metaverse fashion item recognition model.

Figure 4:
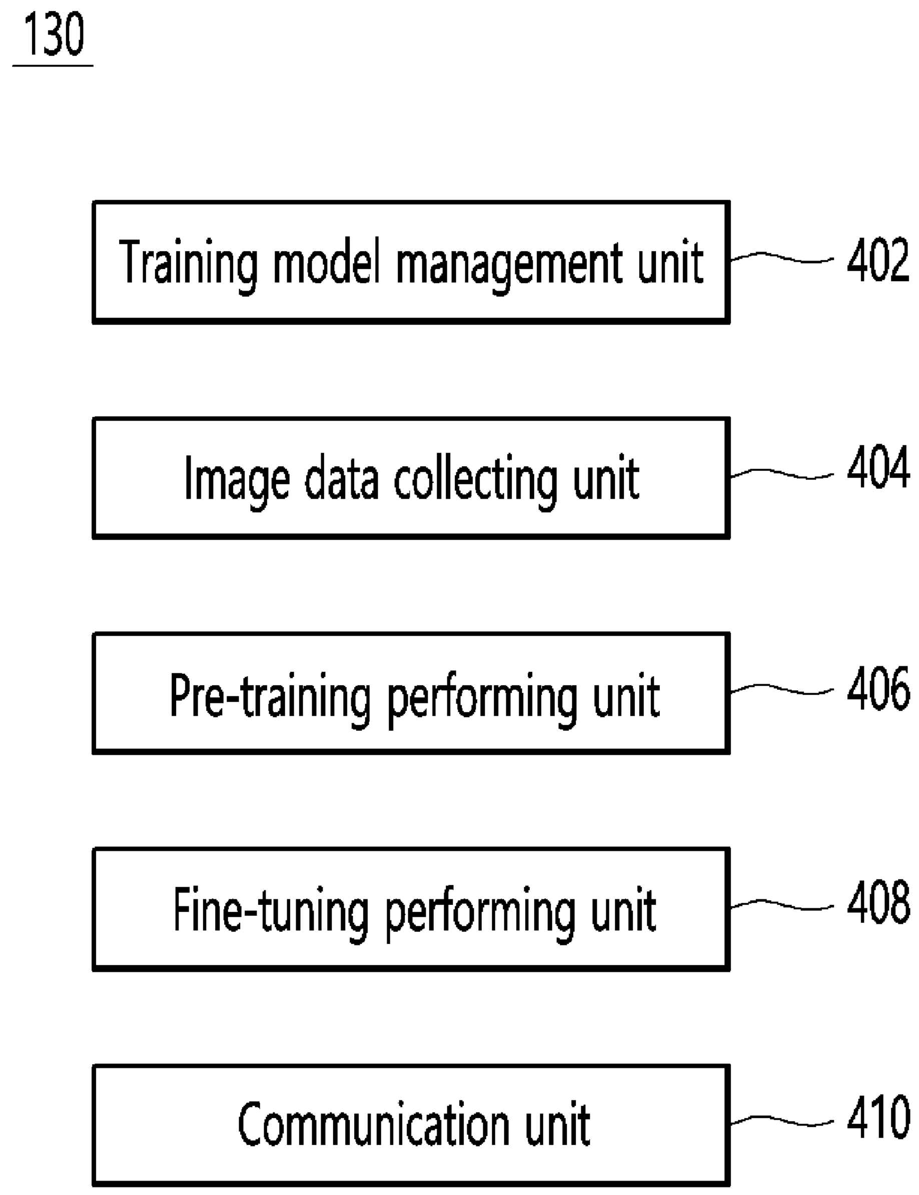
FIG. 4 is a functional block diagram schematically illustrating a functional configuration of an AI model performance improvement server according to one embodiment of the present disclosure.

FIG. 4 is a functional block diagram schematically illustrating a functional configuration of an AI model performance improvement server according to one embodiment of the present disclosure.

Referring to FIG. 4, the AI model performance improvement server 130 may include a training model management unit 402, an image data collecting unit 404, a pre-training performing unit 406, a fine-tuning performing unit 408, and a communication unit 410. The components shown in FIG. 4 do not reflect all of the features of AI model performance improvement server 130, nor are they required, and AI model performance improvement server 130 may include more or fewer components than those shown.

According to one embodiment of the present disclosure, the training model management unit 402, the image data collecting unit 404, the pre-training performing unit 406, the fine-tuning performing unit 408, and the communication unit 410 of the AI model performance improvement server 130 may be modules, at least some of which communicate with an external system. These program modules may be included in the AI model performance improvement server 130 in the form of operating systems, application program modules, or other program modules, and may be physically stored in various publicly available memory devices. Further, such program modules may be stored on a remote memory device communicable with the AI model performance improvement server 130. Such program modules may include, but are not limited to, routines, subroutines, programs, objects, components, data structures, and the like that perform certain tasks described herein or execute certain abstract data types.

According to one embodiment of the present disclosure, the training model management unit 402 may manage training models. According to one embodiment of the present disclosure, the training model management unit 402 may generate, train, and manage pre-training models needed in the pre-training described below and AI models needed in the fine-tuning process. In one embodiment, the training model management unit 402 may store the pre-training model trained in the pre-training process described later, and update the pre-training model for continuously added data. In one embodiment, the training model management unit 402 may generate and manage an item attribute recognition model used in the pre-training process. In one embodiment of the present disclosure, the training model management unit 402 may receive required training models from an external source.

In one embodiment of the present disclosure, the image data collecting unit 404 may perform a function of collecting predetermined image data. In one embodiment, the image data collecting unit 404 may collect image data including at least one item. In one embodiment, the image data collecting unit 404 may collect image data including text information for an image.

In one embodiment of the present disclosure, the image data collecting unit 404 may collect image data from an external source, in particular, images published on an online marketplace or an influencer's social network system (SNS). In one embodiment, the image data collecting unit 404 may collect query images received as input from a server utilizing an AI model generated through a series of processes as image data. In one embodiment of the present disclosure, the image data collecting unit 404 may collect image data at a predetermined interval. In one embodiment, the image data collecting unit 404 may collect image data from a predetermined online marketplace or an influencer's social network system at a predetermined interval.

In one embodiment of the present disclosure, the pre-training performing unit 406 may function to perform pre-training using image data. In one embodiment of the present disclosure, the pre-training performing unit 406 may perform pre-training based on self-supervised training. In one embodiment, the pre-training performing unit 406 may generate a pre-training model and perform pre-training based on self-supervised training. The pre-training model may be used as a general purpose AI model that may be used as an initial value in various AI models which use image data.

In one embodiment of the present disclosure, the pre-training performing unit 406 may perform pre-training based on self-supervised training for image data that includes at least one item and is unlabeled. In one embodiment, the pre-training performing unit 406 may perform pre-training based on self-supervised training by using text information associated with the image data along with the image data. In one embodiment of the present disclosure, the pre-training performing unit 406 may generate text information associated with the image data based on the image data, and use the text data along with the image data to perform pre-training based on self-supervised training. In one embodiment, the pre-training performing unit 406 may extract fashion attributes associated with the image data by using an item attribute recognition model, generate a text representation describing the image data with the fashion attributes, and preform a pre-training based on self-supervised training by using the text representation together with the image. Here, the item attribute recognition model may recognize an item included in the item image and recognize and label the attributes of the item. For example, an item attribute recognition model may recognize and label fashion attributes such as category, length, sleeve length, pattern, style, shape, color, material, fit, detail, neckline, and the like for clothing; may recognize and label attributes such as heel height, heel shape, toe shape, sole shape, and the like for shoes. The item attribution recognition model may also be a model that recognizes and labels each of the characteristic attributes for other bags, accessories, knickknacks, and hats.

Figure 5:
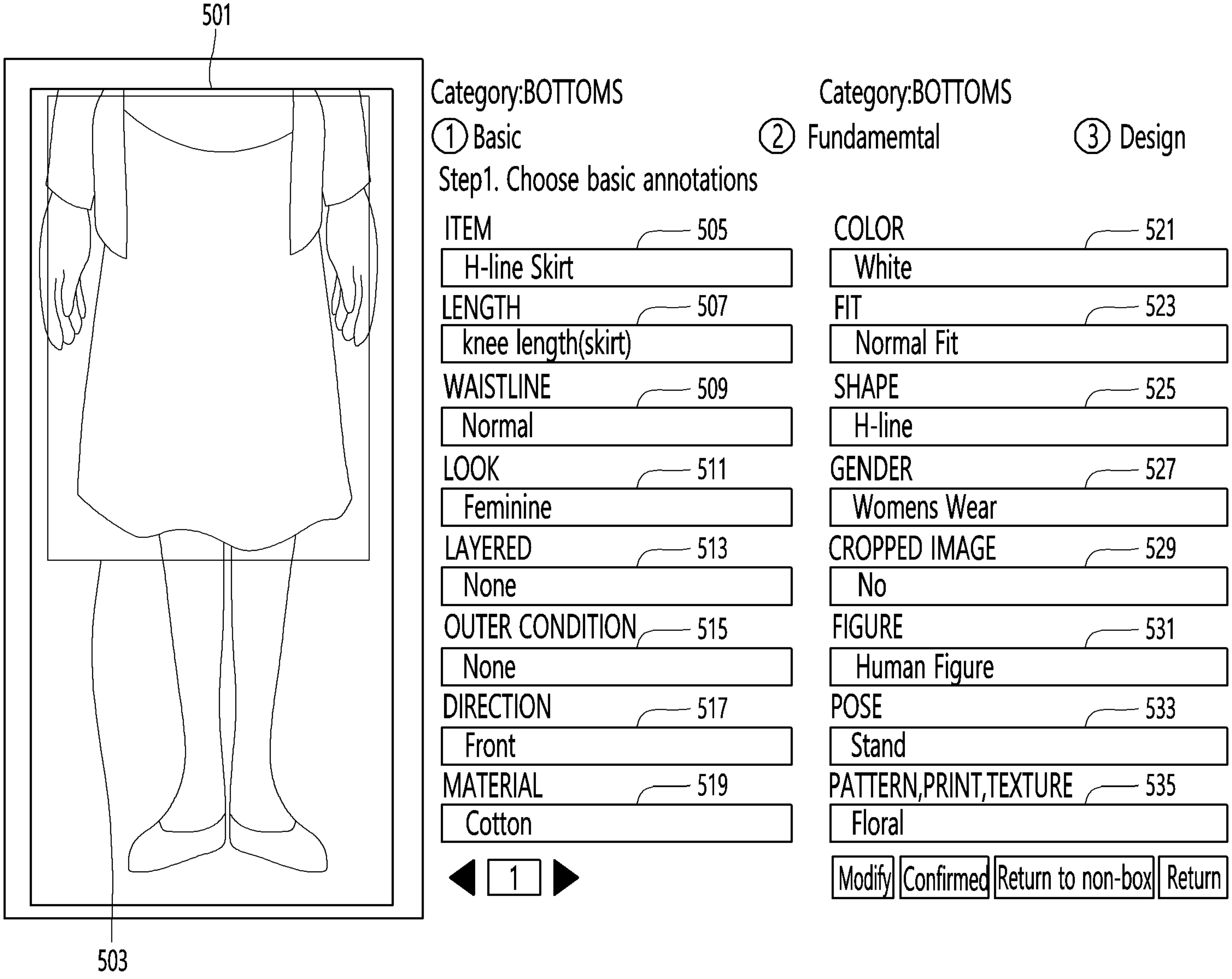
FIG. 5 is a diagram illustrating fashion attribute labeling of items included in image data according one embodiment of the present disclosure.

FIG. 5 is a diagram illustrating fashion attribute labeling of items included in image data according one embodiment of the present disclosure.

Referring to FIG. 5, the pre-training performing unit 406 may detect an item 503 included in the image data 501 by using an item attribute recognition model. In one embodiment, the pre-training performing unit 406 may recognize and label attributes 505 to 535 of the corresponding item 503 by using the item attribute recognition model. For example, for the item 503 included in the image data 501, it may recognize and label the attributes of item type 505, length 507, neckline 509, look 511, layered 513, outer condition 515, orientation 517, material 519, color 521, fit 523, collar and lapels 525, gender 527, cropped image 529, FIG. 531, pose 533, pattern 535 and the like. In one embodiment, the pre-training performing unit 406 may generate the text representation "A floral knee-length H-line skirt made of cotton" by using the value of each attribute of each pattern 535, length 507, item type 505, and material 519 labeled using the item attribute recognition model. In one embodiment, the pre-training performing unit 406 may perform pre-training using the generated text representation "A floral knee-length H-line skirt made of cotton" together with the image in the image data 501.

Referring back to FIG. 4, in one embodiment of the present disclosure, the fine-tuning performing unit 408 may set an initial value of the AI model by using a pre-training model and perform fine-tuning through supervised training. In one embodiment, the fine-tuning performance unit 408 may set the AI model to be targeted, set the initial value of the AI model by using the pre-training model, and perform fine-tuning for the AI model.

In one embodiment of the present disclosure, the fine-tuning performing unit 408 may perform fine-tuning by using one of an item location detection model, an item attribute recognition model, and an item recognition model as an AI model based on supervised training. In one embodiment, the fine-tuning performing unit 408 may train the item location detection model based on supervised training to detect the item location in the image data by using the pre-training model obtained from the pre-training performing unit 406 as an initial value. In one embodiment, the fine-tuning performing unit 408 may train an item attribute recognition model based on supervised training to recognize an attribute of an item in the image data, using the pre-training model obtained from the pre-training performing unit 406 as an initial value. In another embodiment, the fine-tuning performing unit 408 may train an item recognition model based on supervised training to recognize an item in the image data using the pre-training model obtained by the pre-training performing unit 406 as an initial value.

In one embodiment of the present disclosure, the pre-training performing unit 406 may update the pre-training model with additional image data received at a predetermined interval from the image data collecting unit 404, and the fine-tuning performing unit 408 may use the updated pre-training model to train an AI model based on the supervised training thereby improving the performance of the AI model.

According to one embodiment of the present disclosure, the communication unit 410 may perform a function to enable data transmission to/from the training model management unit 402, the image data collecting unit 404, the pre-training performing unit 406, and the fine-tuning performing unit 408.

Figure 6:
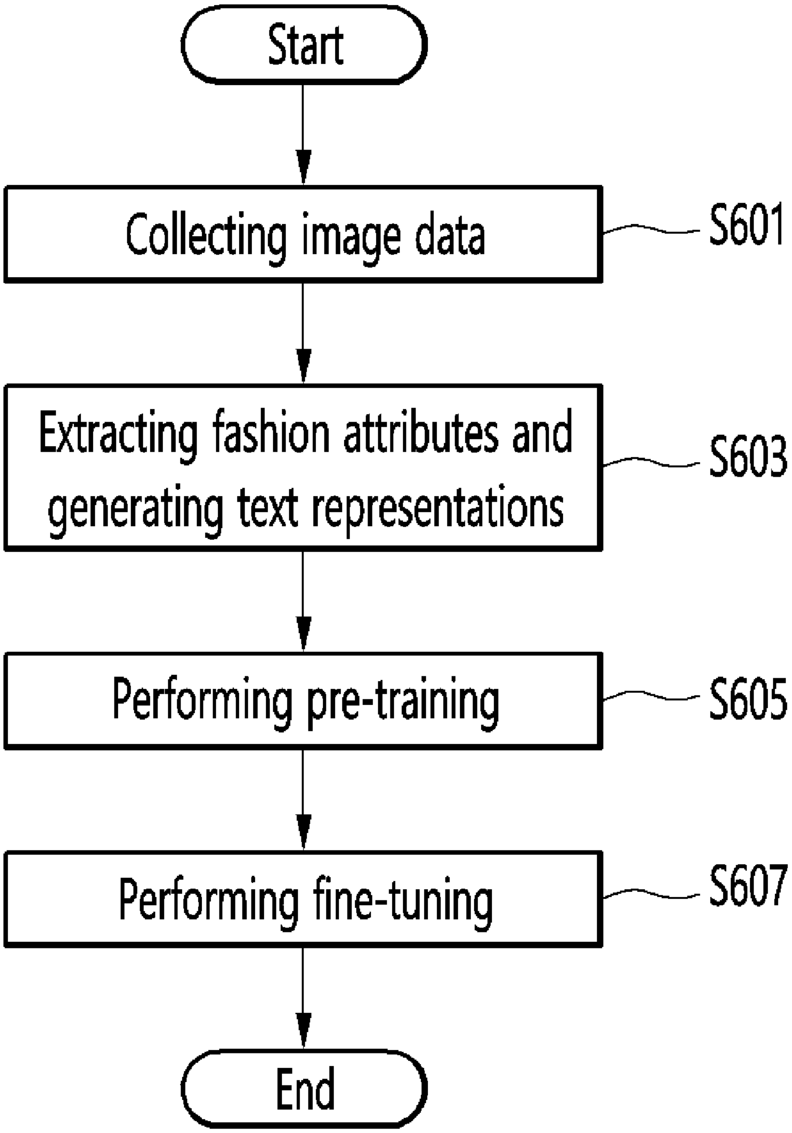
FIG. 6 is a flowchart illustrating a process for improving the performance of an AI model based on self-supervised training by utilizing image data according to one embodiment of the present disclosure.

FIG. 6 is a flowchart illustrating a process for improving the performance of an AI model based on self-supervised training by utilizing image data according to one embodiment of the present disclosure.

First, in a step S601, the AI model performance improvement server 130 collects predetermined image data. In one embodiment, the image data including at least one item may be collected in the step S601.

Next, in a step S603, the AI model performance improvement server 130 extracts fashion attributes from the collected image data and generates a text representation. In one embodiment, the AI model performance improvement server 130 may extract fashion attributes associated with the image data by using an item attribute recognition model, and generate a text representation associated with the image data by using the corresponding fashion attributes. In one embodiment, the step S603 may be omitted if the collected image data includes text information.

In a step S605, the AI model performance improvement server 130 performs pre-training by using the image and text representations of the collected image data. In one embodiment, the AI model performance improvement server 130 may perform pre-training based on self-supervised training for the pre-training model.

Finally, in a step S607, the AI model performance improvement server 130 performs fine-tuning by using the pre-training model. In one embodiment, the AI model performance improvement server 130 may set the AI model to be targeted and perform fine-tuning based on supervised training with the pre-training model as the initial value. In one embodiment, the AI model performance improvement server 130 may perform fine-tuning based on supervised training with a pre-training model as an initial value for an item location detection model, an item attribute recognition model, and an item recognition model.

In one embodiment of the present disclosure, the step S601 may be repeatedly performed at a predetermined interval. In one embodiment, the performance of the AI model may be improved by performing pre-training and fine-tuning again, using the image data added by repeatedly performing the step S601.

In the embodiments of the present disclosure described above with reference to the drawings (and throughout this specification), the user terminal 110 and the AI model performance improvement server 130 are illustrated as being implemented based on a client-server model. Particularly, the client primarily provides user input and output functions and most other functions (particularly many functions related to AI model performance improvement) are delegated to the server, but the present disclosure is not limited thereto. It is to be appreciated that, according to other embodiments of the present disclosure, the AI model performance improvement system environment may be implemented with its functionality evenly distributed between the user terminal and the server, or it may be implemented more dependent on the application environment installed on the user terminal. Furthermore, it is to be understood that when the functions of the AI model performance improvement system are implemented by distributing them between user terminals and servers according to one embodiment of the present disclosure, the distribution of each function of the AI model performance improvement system between clients and servers may be implemented differently in accordance with embodiments. It is to be appreciated that, according to one embodiment of the present disclosure, the main functions of the AI model performance improvement server may be implemented and provided on each user terminal 110 rather than on the AI model performance improvement server 130.

Further, in the foregoing embodiments of the present disclosure, it is described as certain modules performs certain actions for convenience, but the present disclosure is not limited thereto. It is to be appreciated that in other embodiments of the present disclosure, each of the steps described above as being performed by a particular module may be performed by a different, separate module.

The programs executed by the terminals and servers described in the present disclosure may be implemented as hardware components, software components, and/or a combination of hardware components and software components. The programs may be executed by any system capable of executing computer-readable instructions.

Software may include computer programs, code, instructions, or one or more combinations thereof, and may compose processing devices to operate as desired, or may independently or collectively instruct processing devices. The software may be implemented as a computer program including instructions stored on computer-readable storage medium. Computer-readable storage media may include, for example, magnetic storage media (e.g., read-only memory (ROM), random-access memory (RAM), floppy disks, hard disks, and the like.) and optical-readable medium (e.g., CD-ROM, digital versatile disc (DVD)). A computer-readable recording medium may be distributed across networked computer systems so that computer-readable code may be stored and executed in a distributed manner. The medium is readable by a computer and may be stored in memory and executed by a processor.

A computer-readable storage medium may be provided in the form of a non-transitory storage medium. In this context, "non-transitor" means that the storage medium does not contain signals and is tangible, and does not distinguish whether the data is stored on the storage medium on a semi-permanent or temporary basis.

Further, programs according to embodiments of the present disclosure may be provided in a computer program product. The computer program may be traded between a seller and a buyer as a commodity. A computer program may include a software program and a computer-readable storage medium on which the software program is stored. For example, a computer program may include a product (e.g., a downloadable application) in the form of a software program that is distributed electronically by a device manufacturer or through an electronic marketplace (e.g., Google Play Store, App Store). For electronic distribution, at least a portion of the software program may be stored on a storage medium or may be temporarily generated. In this case, the storage medium may be the storage medium of a manufacture's server, an e-marketplace's server, or a relay server that temporarily stores the software program.

In a system including a server and a device, the computer program may include a storage medium of the server or a storage medium of the device. Alternatively, in the presence of a third device (e.g., a smartphone) in communication with the server or the device, the computer program may include a storage medium of the third device. Alternatively, the computer program may include the software program itself that is transmitted from the server to the device or third device, or from the third device to the device. In this case, one of the server, the device, and the third device may execute the computer program to perform the methods according to the disclosed embodiments. Alternatively, two or more of the server, the device, and the third device may execute the computer program to distributedly perform the methods of the disclosed embodiments. For example, a server may execute a computer program stored on the server to control a device in communication with the server to perform methods according to disclosed embodiments. In another example, a third device may execute a computer program to control a device in communication with the third device to perform a method according to a disclosed embodiment. When the third device executes the computer program, the third device may download the computer program from a server and execute the downloaded computer program. Alternatively, the third device may execute a computer program that is provided pre-loaded to perform the methods of the disclosed embodiments.

Although embodiments have been described above by way of limited embodiments and drawings, one of ordinary skill in the art will recognize that various modifications and variations are possible from the above description. For example, suitable results may be achieved if the described techniques are performed in a different order from the methods described, and/or if components of the described computer systems, modules, and the like are combined or assembled in a different form from the methods described, or if other components or equivalents are substituted or replaced.

What is claimed is:

1. A computer-implemented method performed by at least one processor of an AI model performance improvement server for improving performance of an AI model used for recognizing a fashion item in an image the method comprising:

obtaining, via a communication network, first image data and second image data, each including at least one fashion item, the first image data being accompanied by externally provided text information and the second image data not being accompanied by text information;

for each piece of the second image data, detecting a first fashion item by using an item attribute recognition model;

determining fashion attributes for the first fashion item by using the item attribute recognition model, the fashion attributes including at least one of a category, a length, a color, a pattern, a material, a fit, a neckline, and a style;

generating, based on the fashion attributes, a text representation in a form of a natural language sentence describing the first fashion item;

constructing, as training data for a general-purpose AI model configured to utilize image information and text information, first data pairs of the first image data and the externally provided text information and second data pairs of the second image data and the generated text representation;

performing pre-training based on self-supervised training of the general-purpose AI model by using the first data pairs and the second data pairs as input without using labels associated with corresponding images to update parameters of the general-purpose AI model;

using the general-purpose AI model for which the pre-training has been completed as an initial value, performing fine-tuning based on supervised training by using labeled fashion images to thereby generate an improved item attribute recognition model; and generating, by the improved item attribute recognition model, a recognition result of a second fashion item from newly obtained images including the second fashion item.

2. The method of claim 1, wherein obtaining the first image data and second image data comprises:

obtaining images published on an online marketplace or an influencer's social network system (SNS) at a predetermined interval.

3. A non-transitory computer-readable recording medium having stored thereon a computer program for executing the method of claim 1.

4. An automated AI model performance improvement server, comprising:

at least one memory storing computer-executable instructions and at least one processor; and wherein the at least one processor is configured, by executing the computer-executable instructions stored in the at least one memory, to:

obtain, via a communication network, first image data and second image data, each including at least one fashion item, the first image data being accompanied by externally provided text information and the second image data not being accompanied by text information;

for each piece of the second image data, detect a first fashion item by using an item attribute recognition model;

determine fashion attributes for the first fashion item by using the item attribute recognition model, the fashion attributes including at least one of a category, a length, a color, a pattern, a material, a fit, a neckline, and a style;

generate a text representation in a form of a natural language sentence describing the first fashion item based on the fashion attributes;

construct, as training data for a general-purpose AI model configured to utilize image information and text information, first data pairs of the first image data and the externally provided text information and second data pairs of the second image data and the generated text representation;

perform pre-training based on self-supervised training of the general-purpose AI model by using the first data pairs and the second data pairs as input without using labels associated with corresponding images to update parameters of the general-purpose AI model;

using the general-purpose AI model for which the pre-training has been completed as an initial value, perform fine-tuning based on supervised training by using labeled fashion images to thereby generate an improved item attribute recognition model; and generate, by using the improved item attribute recognition model, a recognition result of a second fashion item from newly obtained images including the second fashion item.

* * * * *